United States Patent [19]

Brinson et al.

[11] 4,274,679
[45] Jun. 23, 1981

[54] WHEEL COVER LOCKING MEANS

[75] Inventors: Thomas F. Brinson, Lake Park; Jack A. Bayman, Valdosta, both of Ga.

[73] Assignee: International Telephone and Telegraph Corporation, New York, N.Y.

[21] Appl. No.: 81,336

[22] Filed: Oct. 3, 1979

[51] Int. Cl.$^3$ .............................................. B60B 7/00
[52] U.S. Cl. .............................. 301/37 AT; 301/37 SC
[58] Field of Search ............ 301/37 R, 37 SS, 37 AT, 301/37 SC, 37 S, 108 S, 37 H

[56] References Cited

U.S. PATENT DOCUMENTS 2,727,790 12/1955 Gaylord ............................ 301/37 SC
4,179,163 12/1979 Brown .............................. 301/37 SS

FOREIGN PATENT DOCUMENTS 1028861 5/1966 United Kingdom ................. 301/37 SC Primary Examiner—H. Grant Skaggs
Attorney, Agent, or Firm—James B. Raden; William J. Michals

[57] ABSTRACT

A locking device for securing a wheel cover to a vehicle wheel rim, wherein the wheel cover includes a mounting plate having a retention device for mounting the cover to the rim, and a center cap mounted to the mounting plate. A first threaded fastener is mounted to a central portion of the wheel rim and projects axially outwardly through an opening in the mounting plate. A tubular member is mounted to the center cap and extends axially inwardly from an access opening therein and coaxially with the fastener. A second threaded fastener is slidably mounted within the tubular member between the center cap and the mounting plate and threadedly engages the first fastener. The second fastener includes a torque tool engaging portion at the outer end thereof which is accessable through the access opening in the center cap. A cover member is mounted to the wheel cover, by way of a projection which extends through the access opening and is removably mounted within the tubular member, for concealing the access opening of the locked wheel cover.

14 Claims, 8 Drawing Figures

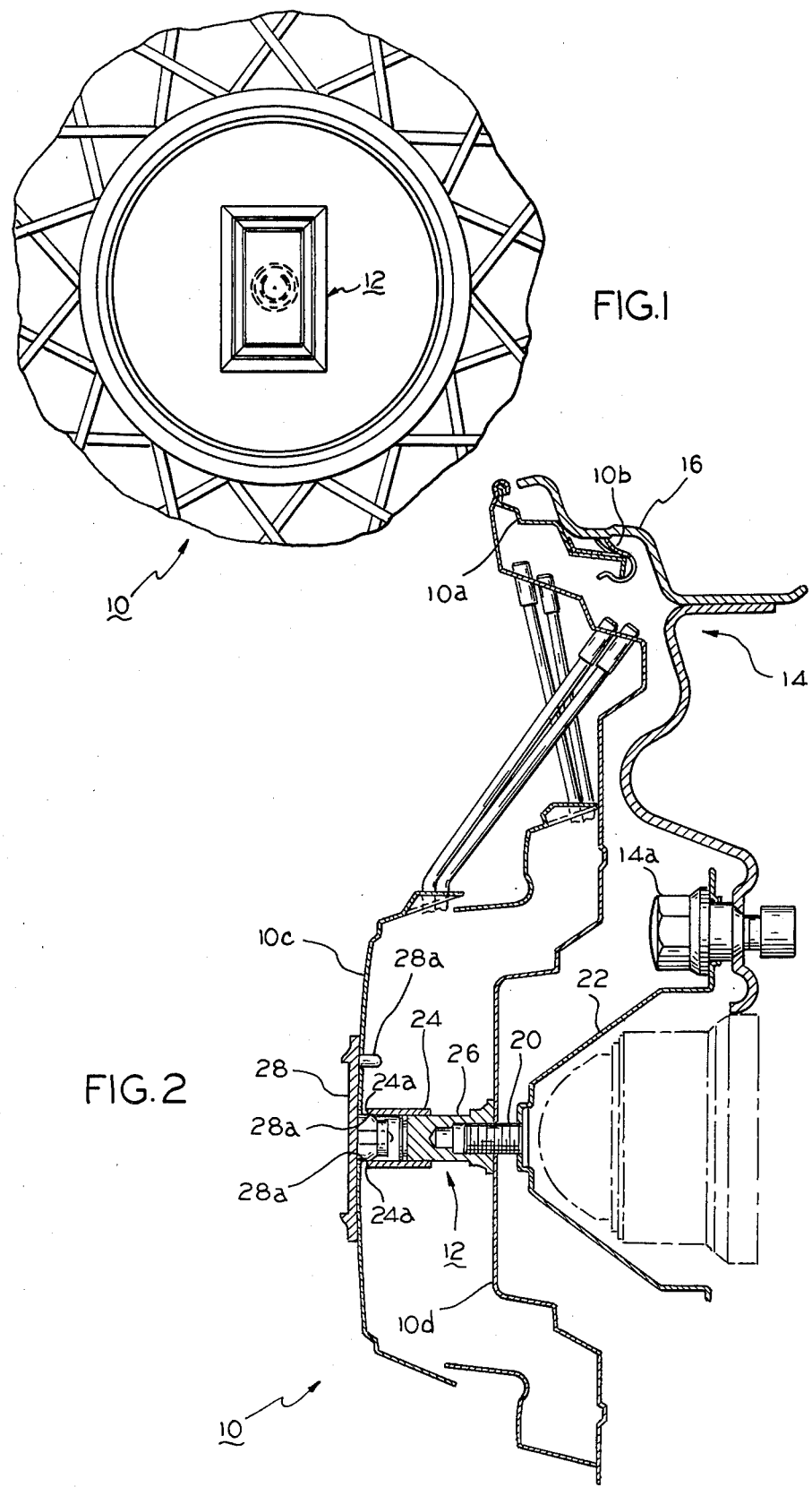

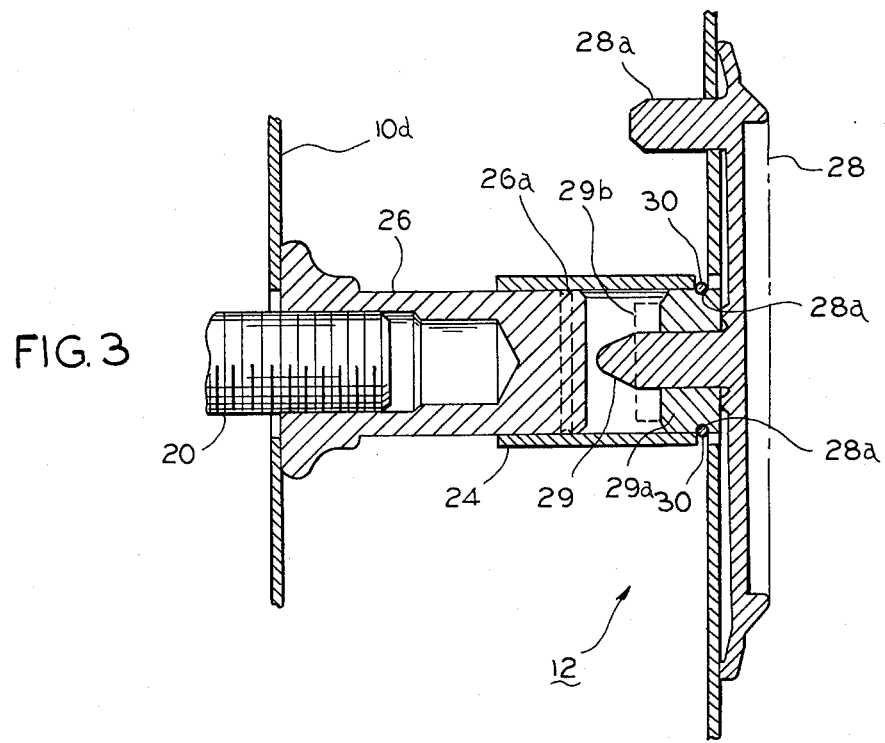
FIG. 3
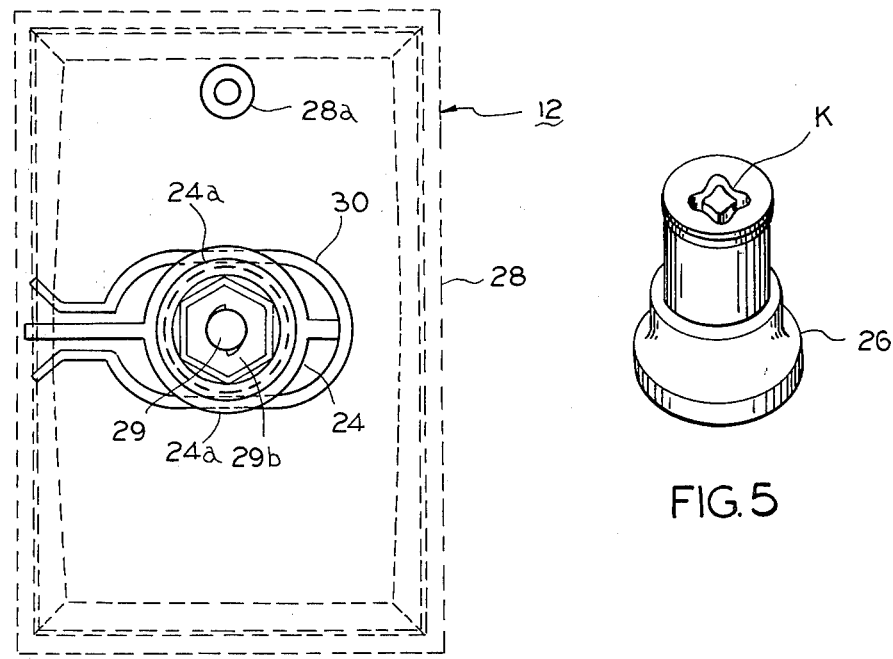
FIG. 4
FIG. 5

WHEEL COVER LOCKING MEANS

BACKGROUND OF THE INVENTION

This invention relates to wheel cover locking devices and, more particularly, to such devices which are particularly suitable for use with heavy wheel covers such as simulated spoke wire wheel covers.

Wheel cover locking means are known and have been used in the art. These devices generally take the form of a keylock arrangement for securing the wheel cover or hub cap to the associated wheel of a motor vehicle. Locking devices which take the form of key-operated fasteners which trap the wheel cover between the device and the valve stem of the wheel have also been used. These devices suffer from one or more disadvantages such as the effects resulting from dirt, water spray and other corrosion inducing environments. These and other disadvantages are overcome by the present invention wherein there is provided a concealed wheel cover locking means suitable use for heavy ornamental wheels such as simulated spoke wheel covers and which are relatively immune to affects of weather and unauthorized tampering but which can be conveniently and readily released to remove the wheel cover from the associated wheel.

SUMMARY OF THE INVENTION

Briefly, a locking device for securing a wheel cover to a vehicle wheel rim wherein the wheel cover includes a generally circular mounting plate including retention means at the peripheral portions thereof for mounting the wheel cover on the wheel rim and having a center cap mounted to the mounting plate, it is provided. The device comprises a first fastener and means for mounting the first fastener to the wheel rim wherein the mounted fastener is directed axially outwardly toward an opening in the mounting plate of the wheel cover. A tubular member is mounted to and depends axially inwardly from an access opening in the center cap of the wheel cover and coaxially with the fastener. A second fastener is slidably mounted in the tubular member between the mounting plate and the center cap for movement toward and away from the first fastener and is removably fixedly engagable therewith to limit the axial outward movement of the mounting plate with respect to the wheel rim.

BRIEF DESCRIPTION OF THE DRAWING

The advantages of this invention will become more readily appreciated as the same becomes completely understood by reference to the following detailed description when taken in conjunction with the accompanying drawing wherein:

FIG. 1 is a plan view, partially broken away, of a simulated spoke wire wheel cover incorporating the wheel cover locking device in accordance with the present invention;

FIG. 2 is a cross-sectional view of the wheel cover of FIG. 1 shown in conjunction with a cross-sectional view of a vehicle wheel and the locking device in accordance with the principles of the present invention;

FIGS. 3, 4 and 5 are various views of a first embodiment of the locking device in accordance with the present invention; and, FIGS. 6, 7 and 8 are various views illustrating an alternate embodiment of the present invention.

DETAILED DESCRIPTION

Figure 6:
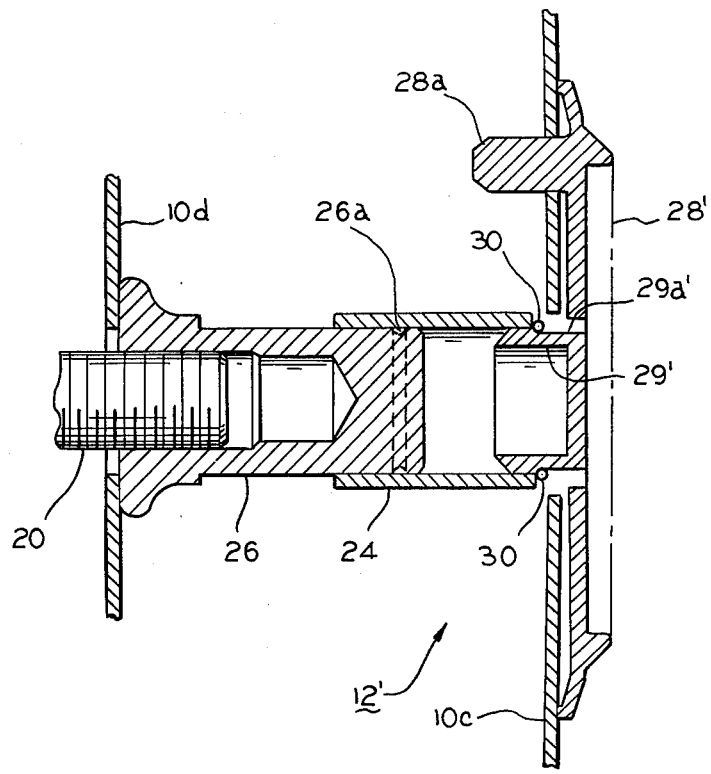

Referring now to FIG. 1 there is shown a plan view, partially broken away, of a simulated wire wheel cover 10 incorporating the locking device shown generally at 12 in accordance with the principles of the present invention. Wheel cover 10 may take the form of the wheel cover illustrated and described in the co-pending application of T. F. Brinson, Ser. No. 27,666 filed Apr. 6, 1979, now U.S. Pat. No. 4,229,048 and assigned to the same assignee as the present invention.

Referring now to FIG. 2 there is shown a cross-sectional view of the wheel cover 10 and locking device 12 of FIG. 1 shown in conjunction with a cross-sectional view of a vehicle wheel shown generally at 14. Wheel 14 includes a central circular body portion or spider with a multi-flanged drop-center rim 16 welded to its periphery. Rim 16 includes an axially directed and radially facing flange which is utilized to mount retaining ring 10a of wheel cover 10 as by means of fastener clips 10b which are suitably mounted to retaining ring 10a as is known in the art. However, retention clips 10b are preferably constructed in accordance with the teachings of co-pending application of J. A. Bayman and R. G. Green, Ser. No. 958,982 filed Nov. 9, 1978, now U.S. Pat. No. 4,218,099 and assigned to the same assignee as the present invention. Wheel cover 10 includes a center cap 10c which is bolted to a mounting plate 10d as is illustrated and described in the aforementioned application of T. F. Brinson.

Locking device 12, in accordance with the present invention, preferably includes a first threaded fastener 20 which is clinched or welded to a cup or inverted cup-like bracket 22 which in turn is removably fastened to wheel 14 such as by means of wheel mounting lugs 14a. Locking device 12 further includes a tubular member 24 which is mounted to and depends axially inwardly from an access opening at the center portion of center cap 10c of wheel cover 10. A second threaded fastener 26 is slidably mounted in tubular member 24 between mounting plate 10d and center cap 10c for movement toward and away from first threaded fastener 20 and is threadedly engagable with fastener 20 to limit the axially outward movement of mounting plate 10d with respect to wheel 14.

Wheel cover locking device 12 further includes a removable center member 28 which is removably mounted on the external surface of center cap 10c and projects through the access opening into tubular member 24 for concealing the access opening on the assembled and locked wheel cover. As best illustrated in FIG. 5, the axially outer end portion of threaded fastener 26 includes a torque tool engaging portion which is engageable with an external torque tool inserted through the access opening and into tubular member 24 when removable center member 28 is removed from center cap 10c. The torque tool engaging surface preferably takes a unique geometric configuration requiring a corresponding unique tool so as to thwart unauthorized removal of wheel cover 10 from wheel 14. Removable center member 28 further includes a locating pin 28a which projects through a small aperture on center cap 10c for orientating center member 28 with respect to center cap 10c. It can be seen that locating pin 28 and the surrounding aperture are concealed by the external surface of removable center member 28, when the latter is assembled onto wheel cover 10. As discussed more fully hereinafter, tubular member 24 includes a pair of slots 24a which receives a spring clip which projects through the slots for engagement with a corresponding recessed groove 28a in the projecting generally cylindrical portion of removable center member 28.

Referring now to FIGS. 3, 4 and 5 there are shown detailed views of the locking device of FIGS. 1 and 2 in accordance with the teachings of the present invention. FIG. 3 illustrates a somewhat more detailed cross-sectional view of locking device 12. It can be seen that a retaining ring 30, which may take the form of a U-shaped spring steel clip, is disposed in grooves 24a and 28a of tubular member 24 and removable center member 28, respectively. It can also be seen that slidable threaded fastener 26 also includes a recess groove 26a at its axially outward end for receiving a portion of spring clip 30 therein when threaded fastener 26 is moved away from threaded fastener 20 thereby to retain threaded fastener 26 within tubular member 24 during the initial factory assembly of the wheel cover 10. In one constructed embodiment, removable center member 28 included a projecting center pin 29 for receiving a retaining ring 29a which was secured thereon by means of a stamped threaded nut 29b. FIG. 4 is an underside view of center cap 10c and removable center member 28 illustrating the relative positioning of clip 30 with respect to the slots 24a and tubular member 24. As previously described, threaded fastener 26 includes a keyed socket K as illustrated in FIG. 5 which is adapted to receive a corresponding external torque tool for threadedly advancing or disengaging threaded fastener 26 from first threaded fastener 20 of the locking device 12, in accordance with the present invention.

The operation of locking device 12 in accordance with the present invention is summarized as follows. During the initial assembly of center cap 10c to mounting plate 10d of wheel cover 10, the second threaded fastener 26 is retained within tubular member 24 by means of the recessed groove 26a and spring clip 30 the latter of which is snapped into engagement with second threaded fastener 26. After the initial assembly of wheel cover 10, the wheel cover is locked on to the associated wheel 14 by installing the wheel cover in the conventional manner than releasing second fastener 26 from tubular member 30 by pushing second fastener 26 axially inwardly and out of engagement with spring clip 30. Thereafter, threaded fastener 26 threadedly engages first threaded fastener 20 to secure wheel cover 10 to wheel 14. Thereafter, center cover member 28 is pushed into center cap 10c until spring clip 30 snaps-in and thereby locks retaining ring 29a to tubular member 30. As previously described, locating pin 28a is disposed within a corresponding aperture of center cap 10c to orient the removable center member 28 with respect to the wheel cover 10. Removable center member can be readily removed by means of a pen knife or small screw driver to gain access to the key socket K of the removable threaded fastener 26.

Figure 7:
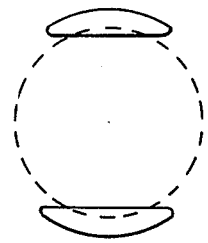
Figure 8:
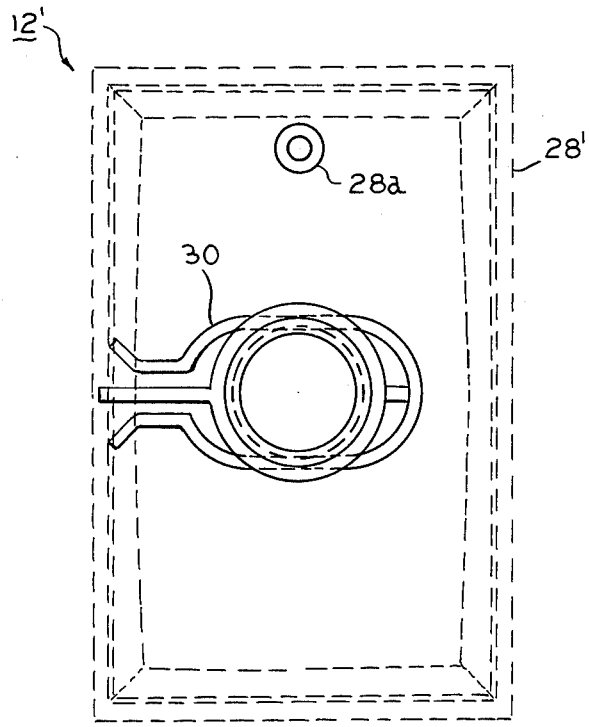

Referring now to FIG. 6-8 there are shown various views of an alternate embodiment of the locking device 12' in accordance with the present invention. Locking device 12' is similar to locking device 12 of the previous drawing figures and accordingly like elements bear like reference numerals. Locking device 12' differs from locking device 12 in that the stamped nut 29b and retaining ring 29a are replaced by a larger and generally cylindrical integral projecting center member 29'. Projecting center pin 29' is provided with an undercut or recessed portion 29a' which provides essentially the same function as recessed groove 28a of device 12 of the previous drawing figures. FIG. 8 is an underside view of removable center member 28' as would be seen by looking axially outwardly in the area between mounting plate 10d and center cap 10c. FIG. 7 is a view looking axially inwardly from the external surface of removable center member 28' and illustrates the slotted portions of removable center cap 28'. It will be appreciated by those skilled in the art that the recessed central portion of the external surface of removable center member 28' is suitably covered by a decorative medallion to meet the ornamental needs of a given wheel cover application.

In still another constructed embodiment of the locking device in accordance with the present invention, first threaded fastener 20 was replaced with a threaded nut which was suitably fastened or welded to the inverted cup mounting bracket 22 and wherein the slidably mounted second fastener 26 was replaced with a threaded bolt slidably mounted within tubular member 30 and including a threaded shank for extending through and threadedly engaging the fixedly mounted threaded nut on inverted cup mounting bracket 22.

What has been taught, then, is a wheel cover locking device facilitating, notably, locking engagement with a relatively heavy simulated spoke wire wheel cover to an associated wheel of a vehicle. The forms of the invention illustrated and described herein are but preferred embodiments of these teachings. They are shown as illustrations of the inventive concepts, however, rather than by way of limitation, and it is pointed out that various modifications and alterations maybe indulged in within the scope of the appended claims.

What is claimed is:

1. A locking device for securing a wheel cover to a vehicle wheel rim said wheel cover having a generally curcular mounting plate including retention means at the peripheral portions thereof for mounting said wheel cover on said wheel rim and having a center cap mounted to said mounting plate, said device comprising in combination:
   a first threaded fastener;
   means for mounting said first threaded fastener to said wheel rim wherein the mounted fastener projects axially outwardly and through an opening in said mounting plate of said wheel cover;
   a tubular member mounted to and depending axially inwardly from an access opening in said center cap of said wheel cover coaxially with said fastener; and,
   a second threaded fastener slidably mounted in said tubular member and captured therein between said mounting plate and said center cap for unengaged movement toward and away from said first threaded fastener and being threadedly engageable therewith to limit the axially outward movement of said mounting plate with respect to said wheel rim.

2. The device according to claim 1, including a removable center member removably mounted on the external surface of said center cap and projecting through said access opening and into said tubular member for concealing said access opening.

3. The device according to claim 2, wherein the axially outward end of said second threaded fastener includes a torque tool engaging portion engagable with an external torque tool inserted through said access opening and into said tubular member when said removable center member is removed from said center cap.

4. The device according to claim 3, wherein said center member includes a locating pin which projects through a second opening on said center cap for orientating said center member with respect to said center cap.

5. A locking device for securing a wheel cover to a vehicle wheel rim said wheel cover having a generally circular mounting plate including retention means at the peripheral portions thereof for mounting said wheel cover on said wheel rim and having a center cap mounted to said mounting plate, said device comprising in combination:

a first threaded fastener;
means for mounting said first threaded fastener to said wheel rim wherein the mounted fastener projects axially outwardly and through an opening in said mounting plate of said wheel cover;
a tubular member mounted to and depending axially inwardly from an access opening in said center cap of said wheel cover coaxially with said fastener;
a second threaded fastener slidably mounted in said tubular member between said mounting plate and said center cap for movement toward and away from said first threaded fastener and being threadedly engagable therewith to limit the axially outward movement of said mounting plate with respect to said wheel rim;
a removable center member removably mounted on the external surface of said center cap and projecting through said access opening and into said tubular member for concealing said access opening;
wherein the axially outward end of said second threaded fastener includes a torque tool engaging portion engagable with an external torque tool inserted through said access opening and into said tubular member when said removable center member is removed from said center cap;
wherein said center member includes a locating pin which projects through a second opening on said center cap for orientating said center member with respect to said center cap; and,
wherein said tubular member includes a spring clip along a portion of its inner wall at the axially outward end portion thereof and wherein the portion of said center member which projects through said access opening includes a recessed groove for receiving at least a portion of said spring clip therein.

6. The device according to claim 5, wherein said second threaded fastener includes a recessed groove at its axially outward end thereof for receiving at least a portion of said spring clip therein when said second threaded fastener is moved away from said first threaded member thereby to retain said second threaded member during the initial installation of said wheel cover onto said wheel rim.

7. The device according to claim 6, wherein said means for mounting said fastener includes an inverted cup member the open end of which surrounds the central hub of said vehicle and which further includes an annular radially outwardly directed flange.

8. A locking device for securing a wheel cover to a vehicle wheel rim said wheel cover having a generally circular mounting plate including retention means at the pheripheral portions thereof for mounting said wheel cover on said wheel rim and having a center cap mounted to said mounting plate, said device comprising in combination:

a first threaded fastener;
means for mounting said first threaded fastener to said wheel rim wherein the mounted fastener is directed axially outwardly toward an opening in said mounting plate of said wheel cover;
a tubular member mounted to and depending axially inwardly from an access opening in said center cap of said wheel cover coaxially with said fastener; and,
a second threaded fastener slidably mounted in said tubular member and captured therein between said mounting plate and said center cap for unengaged movement toward and away from said first threaded fastener and being threaddedly engagable therewith to limit the axially outward movement of said mounting plate with respect to said wheel rim.

9. The device according to claim 8, including a removable center member removably mounted on the external surface of said center cap and projecting through said access opening and into said tubular member for concealing said access opening.

10. The device according to claim 9, wherein the axially outward end of said second threaded fastener includes a torque tool engaging portion engageable with an external torque tool inserted through said access opening and into said tubular member when said removable center member is removed from said center cap.

11. A locking device for securing a wheel cover to a vehicle wheel rim said wheel cover having a generally circular mounting plate including retention means at the peripheral portions thereof for mounting. said wheel cover on said wheel rim and having a center cap mounted to said mounting plate, said device comprising in combination:

a first fastener;
means for mounting said first fastener to said wheel rim wherein the mounted fastener is directed axially outwardly toward an opening in said mounting plate of said wheel cover;
a tubular member mounted to and depending axially inwardly from an access opening in said center cap of said wheel cover coaxially with said fastener; and,
a second fastener slidably mounted in said tubular member and captured therein between said mounting plate and said center cap for unengaged movement toward and away from said first fastener and being removably fixedly engageable therewith to limit the axially outward movement of said mounting plate with respect to said wheel rim.

12. The device according to claim 11, including a removable center member removably mounted on the external surface of said center cap and projecting through said access opening and into said tubular member for concealing said access opening.

13. The device according to claim 11, wherein said second fastener includes a torque tool engaging portion at the axially outwardly end thereof for engaging an external torque tool which is insertable through said access opening.

14. The device according to claim 13, wherein said center member includes a locating pin which projects through a second opening on said center cap for orientating said center member with respect to said center cap.

* * * * *

UNITED STATES PATENT OFFICE
CERTIFICATE OF CORRECTION

Patent No. 4,274,679　　　　　　　　　Dated June 23, 1981

Inventor(s) Thomas F. Brinson; Jack A. Bayman

It is certified that error appears in the above-identified patent and that said Letters Patent are hereby corrected as shown below:

Column 6, line 57, change "11" to --12--.

Signed and Sealed this

Seventh Day of January 1986

[SEAL]

Attest:

DONALD J. QUIGG

Attesting Officer　　　　Commissioner of Patents and Trademarks